(12) United States Patent
Ito

(10) Patent No.: US 12,038,583 B2
(45) Date of Patent: Jul. 16, 2024

(54) HEAD-MOUNTED DISPLAY

(71) Applicant: JVCKENWOOD Corporation, Yokohama (JP)

(72) Inventor: Fumihiko Ito, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 13 days.

(21) Appl. No.: 17/727,521

(22) Filed: Apr. 22, 2022

(65) Prior Publication Data

US 2022/0244547 A1    Aug. 4, 2022

Related U.S. Application Data

(63) Continuation of application No. PCT/JP2020/031289, filed on Aug. 19, 2020.

(30) Foreign Application Priority Data

Nov. 5, 2019    (JP) ................... 2019-200643

(51) Int. Cl.
*G02B 27/01*    (2006.01)
*G02B 5/10*    (2006.01)

(52) U.S. Cl.
CPC .......... *G02B 27/0172* (2013.01); *G02B 5/10* (2013.01); *G02B 2027/011* (2013.01); *G02B 2027/0123* (2013.01)

(58) Field of Classification Search
CPC ............................. G02B 27/0172; G02B 5/10; G02B 2027/011; G02B 2027/0123

USPC ......................................................... 345/7–8
See application file for complete search history.

(56) References Cited

U.S. PATENT DOCUMENTS

| | | | |
|---|---|---|---|
| 6,288,689 B1 | 9/2001 | Shikama | |
| 2013/0127980 A1* | 5/2013 | Haddick | G06F 3/013 |
| | | | 348/14.08 |
| 2016/0187654 A1* | 6/2016 | Border | G02B 27/0172 |
| | | | 359/630 |
| 2016/0278695 A1* | 9/2016 | Wang | A61B 5/7445 |
| 2017/0097511 A1* | 4/2017 | Xu | G02B 30/40 |

FOREIGN PATENT DOCUMENTS

| | | | | |
|---|---|---|---|---|
| CA | 3030848 A1 * | 1/2018 | ......... | G02B 17/0864 |
| JP | H10-327373 A | 12/1998 | | |
| JP | 2000-352692 A | 12/2000 | | |
| JP | 2004-236191 A | 8/2004 | | |
| KR | 2013-0116547 A1 | 10/2013 | | |
| KR | 101840405 B1 * | 3/2018 | .......... | G03H 1/2205 |

* cited by examiner

*Primary Examiner* — Kwin Xie
(74) *Attorney, Agent, or Firm* — Procopio, Cory, Hargreaves & Savitch LLP

(57) ABSTRACT

A head-mounted display according to the present embodiment includes a combiner which is aspherical, arranged in front of a user, and configured to reflect display light for forming a display image toward the user, and a beam splitter which is arranged between the combiner and the user, and configured to reflect the display light to the combiner and transmit display light reflected by the concave mirror. In an optical system, in a range outside the effective viewing angle, the distortion exceeds 5% and increases toward an outside of a viewing field.

6 Claims, 19 Drawing Sheets

Fig. 1
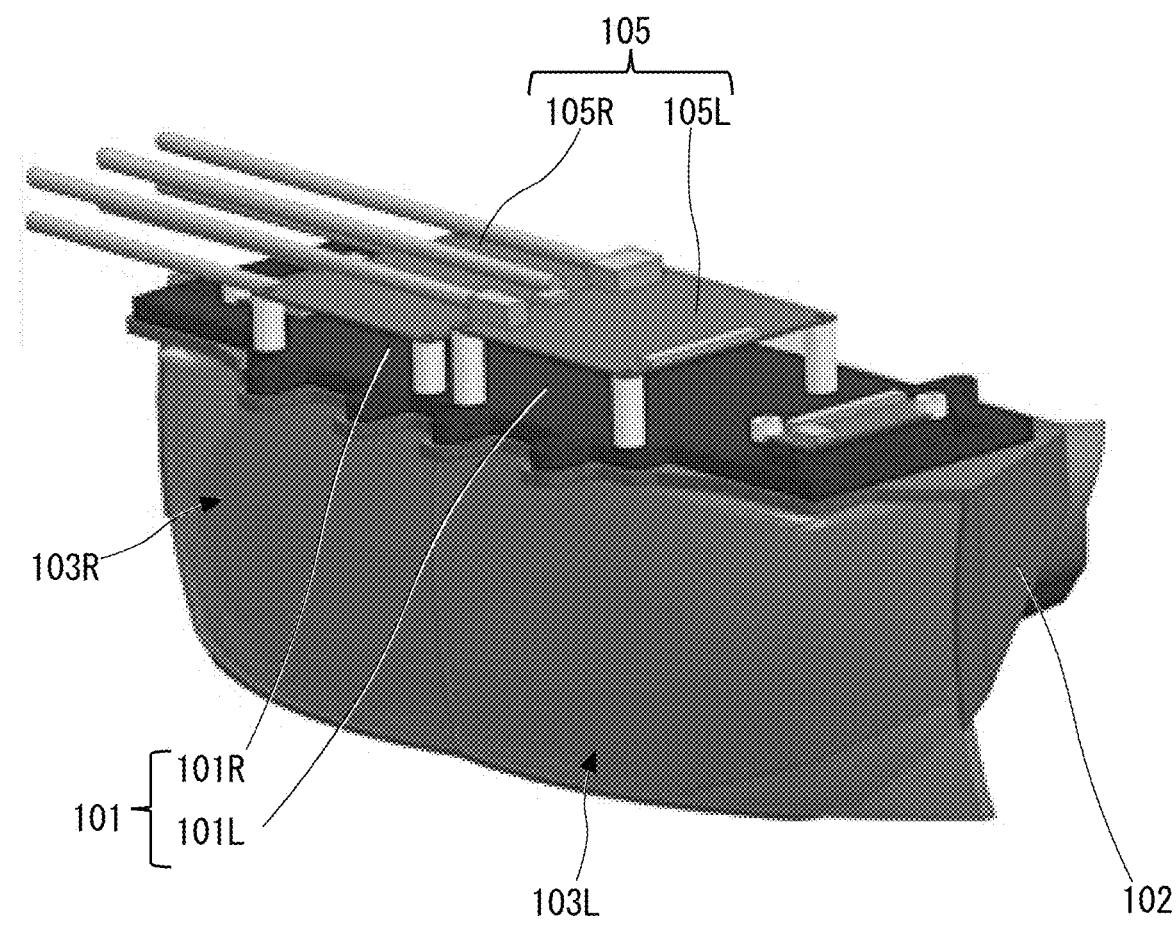
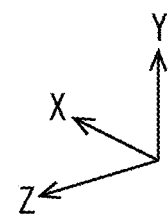

| CURVATURE c | CONIC CONSTANT k | α1 | α2 | α3 | α4 | α5 |
|---|---|---|---|---|---|---|
| -5.556E-3 | 0 | 0 | 0 | 0 | -7.923E-14 | 2.160E-17 |

Fig. 9

| | CONIC CONSTANT k | α1 | α2 | α3 | α4 | α5 |
|---|---|---|---|---|---|---|
| EXAMPLE 2 | 0 | 0 | -8.714E-08 | 1.122E-10 | -1.312E-13 | 2.986E-17 |
| EXAMPLE 3 | 0 | 0 | -1.039E-07 | 1.397E-10 | -1.581E-13 | 3.612E-17 |

Fig. 14

ASPHERICAL COEFFICIENTS

| Coeff. | R-200 | R-180 | R-150 | R-120 | R-100 |
|---|---|---|---|---|---|
| $\alpha 2$ | -8.049E-08 | -8.714E-08 | -1.039E-07 | -1.361E-07 | -1.735E-07 |
| $\alpha 3$ | 9.832E-11 | 1.122E-10 | 1.397E-10 | 1.792E-10 | 2.151E-10 |
| $\alpha 4$ | -1.181E-13 | -1.312E-13 | -1.581E-13 | -2.002E-13 | -2.432E-13 |
| $\alpha 5$ | 2.687E-17 | 2.986E-17 | 3.612E-17 | 4.614E-17 | 5.656E-17 |

ABSOLUTE VALUES OF ASPHERICAL COEFFICIENTS

| Coeff. | R-200 | R-180 | R-150 | R-120 | R-100 |
|---|---|---|---|---|---|
| $\alpha 2$ | 8.049E-08 | 8.714E-08 | 1.039E-07 | 1.361E-07 | 1.735E-07 |
| $\alpha 3$ | 9.832E-11 | 1.122E-10 | 1.397E-10 | 1.792E-10 | 2.151E-10 |
| $\alpha 4$ | 1.181E-13 | 1.312E-13 | 1.581E-13 | 2.002E-13 | 2.432E-13 |
| $\alpha 5$ | 2.687E-17 | 2.986E-17 | 3.612E-17 | 4.614E-17 | 5.656E-17 |

Fig. 18

HEAD-MOUNTED DISPLAY

CROSS REFERENCE TO RELATED APPLICATION

This application is based upon and claims the benefit of priority from Japanese patent application No. 2019-200643 filed on Nov. 5, 2019, the disclosure of which is incorporated herein in its entirety by reference.

BACKGROUND

The present disclosure relates to a head-mounted display.

Patent Literature 1 (Japanese Unexamined Patent Application Publication No. 2000-352692) discloses a head-mounted display device having a concave mirror. In the device of Patent Literature 1, the concave mirror is an aspherical mirror. To be specific, C=0 and D=0 in Examples 1 to 5 where A, B, C, and D denote fourth-order, sixth-order, eighth-order, and tenth-order aspherical coefficients.

SUMMARY

In a head-mounted display as described above, it is desired to make the display quality higher. For example, it is desired to obtain a wide viewing angle.

The head-mounted display according to the present embodiment includes a concave mirror which is aspherical, arranged in front of a user, and configured to reflect display light for forming a display image toward the user, and a beam splitter which is arranged between the concave mirror and the user, and configured to reflect the display light to the concave mirror and transmit display light reflected by the concave mirror, in which in an optical system, in a range outside the effective viewing angle, a distortion exceeds 5% and increases toward an outside of a viewing field.

BRIEF DESCRIPTION OF THE DRAWINGS

FIG. 1 is a view showing a part of the structure of a head-mounted display according to an embodiment.

FIG. 9 is a table showing aspherical coefficients of Example 1.

FIG. 14 is a table showing aspherical coefficients of Example 2 and Example 3.

FIG. 18 is a diagram showing an example of aspherical coefficients in an optical system of the second embodiment.

DETAILED DESCRIPTION

Specific embodiments of the present invention are described hereinafter in detail with reference to the drawings. The present disclosure, however, is not limited to the below-descried embodiments. The following description and the attached drawings are appropriately simplified to clarify the explanation.

First Embodiment

Figure 2:
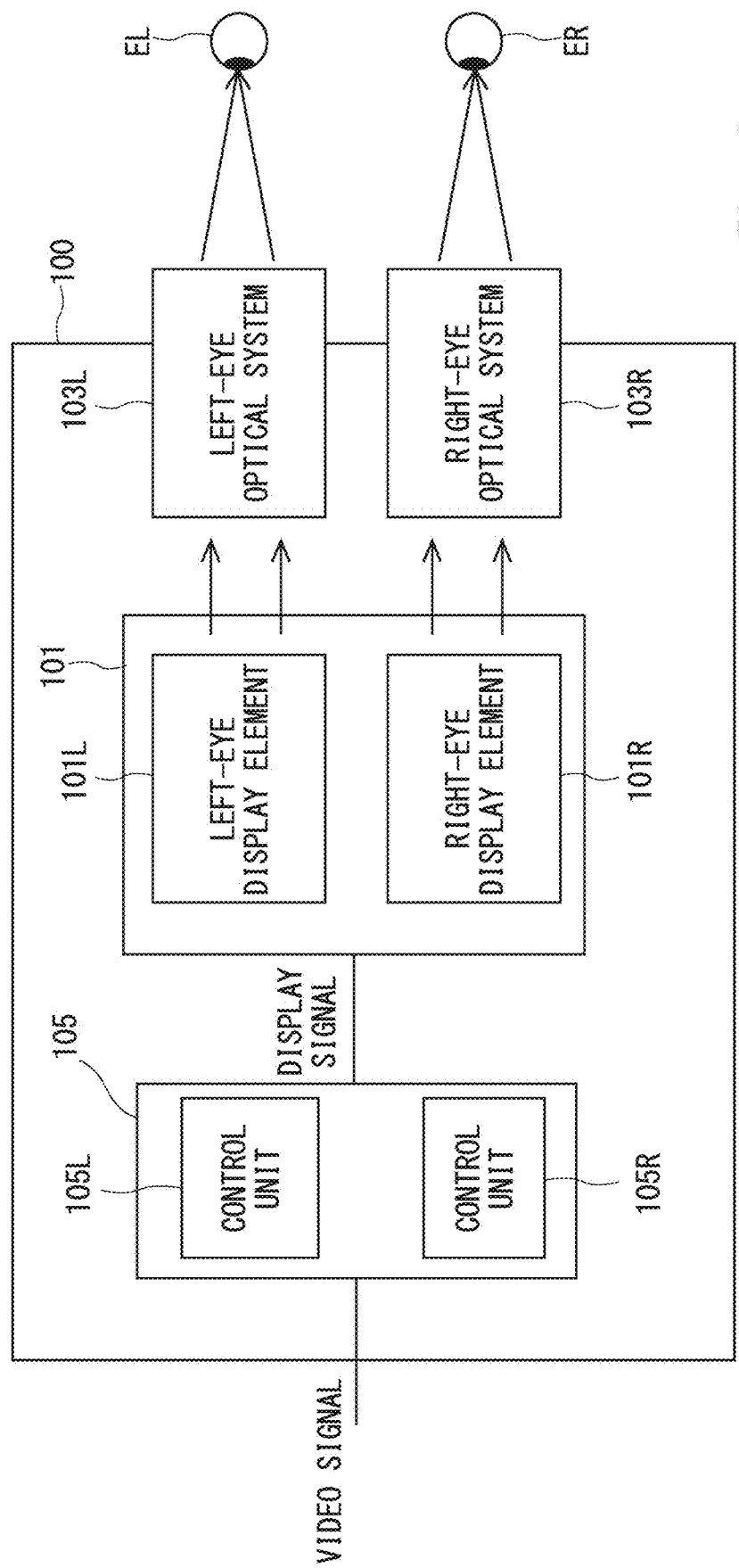
FIG. 2 is a view showing functional blocks of the head-mounted display according to the embodiment.

A head-mounted display and a display method of the same according to an embodiment are described hereinafter with reference to the drawings. FIG. 1 is a perspective view schematically showing a part of a structure of a head-mounted display 100. FIG. 2 is a view showing some of functional blocks of the head-mounted display 100. FIGS. 1 and 2 mainly show a structure related to image display of the head-mounted display 100. FIG. 1 shows the internal structure of the head-mounted display 100, and the elements shown in FIG. 1 may be covered with a cover or the like in practice.

The head-mounted display 100 is applicable to various purposes, such as game, entertainment, industrial, medical, and flight simulation purposes. The head-mounted display 100 may be a VR (Virtual Reality) head-mounted display, an AR (Augmented Reality) head-mounted display, or an MR (Mixed Reality) head-mounted display, for example. Note that the head-mounted display 100 is an optical see-through head-mounted display used for AR or MR in this embodiment, but may be a non-transmissive head-mounted display.

To clarify the explanation, an XYZ three-dimensional Cartesian coordinate system is used in the following description. As seen from a user, the front-back direction (depth direction) is Z direction, the left-right direction (horizontal direction) is X direction, and the up-down direction (vertical direction) is Y direction. The front direction is +Z direction, the back direction is −Z direction, the right direction is +X direction, the left direction is −X direction, the up direction is +Y direction, and the down direction is −Y direction.

The user, which is not shown, is wearing the head-mounted display 100. The head-mounted display 100 includes a display element unit 101, a frame 102, a left-eye optical system 103L, a right-eye optical system 103R, and a control unit 105. The control unit 105 includes a control unit 105L and a control unit 105R.

The frame 102 has goggles or glasses shape, and it is worn on the head of the user by a head band, which is not shown, or the like. The display element unit 101, the left-eye optical system 103L, the right-eye optical system 103R, the control unit 105L, and the control unit 105R are mounted on the frame 102. Note that, although the binocular head-mounted display 100 is shown in FIG. 1, the head-mounted display may be a glasses-shaped non-immersive head-mounted display.

The display element unit 101 includes a left-eye display element 101L and a right-eye display element 101R. The left-eye display element 101L generates a display image for a left eye. The right-eye display element 101R generates a display image for a right eye. Each of the left-eye display element 101L and the right-eye display element 101R includes a flat-panel display such as a liquid crystal monitor or an organic EL (Electro-Luminescence) monitor. The left-eye display element 101L and the right-eye display element 101R may be curve-shaped displays. Each of the left-eye display element 101L and the right-eye display element 101R includes a plurality of pixels arranged in an array. The array arrangement is not limited to two-dimensional matrix arrangement, and it may be PenTile arrangement or the like. The left-eye display element 101L is arranged on the left side (−X side) of the right-eye display element 101R.

The control unit 105 is provided above (on the +Y side) the display element unit 101. A video signal, a control signal, and power from the outside are supplied to the control unit 105. For example, a video signal and the like are input to the control unit 105 by wired connection such as HDMI (registered trademark) or wireless connection such as WiFi (registered trademark) or BlueTooth (registered trademark). The head-mounted display 100 may include a video generation unit (not shown) that generates a video signal, and a video signal or the like generated by the video generation unit may be input to the control unit 105.

The control unit 105L and the control unit 105R include hardware resources such as a CPU (Central Processing Unit), a memory and the like, and operates according to a computer program stored in the memory. Further, each of the control unit 105L and the control unit 105R includes a display driving circuit or the like. The control unit 105L generates a display signal of a left-eye image on the basis of a video signal, a control signal and the like and outputs it to the left-eye display element 101L. The left-eye display element 101L thereby outputs display light for displaying the left-eye image. The control unit 105R generates a display signal of a right-eye image on the basis of a video signal, a control signal and the like and outputs it to the right-eye display element 101R. The right-eye display element 101R thereby outputs display light for displaying the right-eye image. In this manner, the control unit 105 outputs display signals to the display element unit 101.

Note that the display element unit 101 does not necessarily have the structure in which the left-eye display element 101L and the right-eye display element 101R are separate display elements, and it may have a single display element. The single display element may generate a display image for a left eye and a display image for a right eye. In this case, the display element unit 101 generates a left-eye image by using a part on one side of the display area of the display and generates a right-eye image by using a part on the other side of the display area of the display.

Some or all of the display element unit 101, the control unit 105 and the like are not necessarily fixed to the frame 102, and they may be mounted detachable from the frame 102. For example, the display element unit 101, the control unit 105 and the like may be implemented by mounting a smartphone or a tablet computer on the frame 102. In this case, an application program (app) that generates display images for the head-mounted display is previously installed into the smartphone or the like.

The left-eye optical system 103L guides the display light that is output from the left-eye display element 101L to the left eye EL of the user as a left-eye image. The right-eye optical system 103R guides the display light that is output from the right-eye display element 101R to the right eye ER of the user as a right-eye image. The left-eye optical system 103L is arranged on the left side (−X side) of the right-eye optical system 103R. The left-eye optical system 103L is arranged in front (+Z direction) of the left eye EL of the user. The right-eye optical system 103R is arranged in front (+Z direction) of the right eye ER of the user. The user is able to see a virtual image of a display image generated by the display element unit 101 in the front (in the +Z direction).

As described above, the head-mounted display 100 according to this embodiment may either be a semitransparent or non-transmissive head-mounted display. Note that the description herein is provided assuming that the head-mounted display 100 is a semitransparent head-mounted display. Thus, the left-eye optical system 103L and the right-eye optical system 103R include a combiner, which is described later. In the semitransparent head-mounted display 100, display light from the display element unit 101 and outside light enter the left eye EL and the right eye ER. Thus, the user is able to see a superimposed image on which a display image is superimposed on a view in the front (in the +Z direction).

Figure 3:
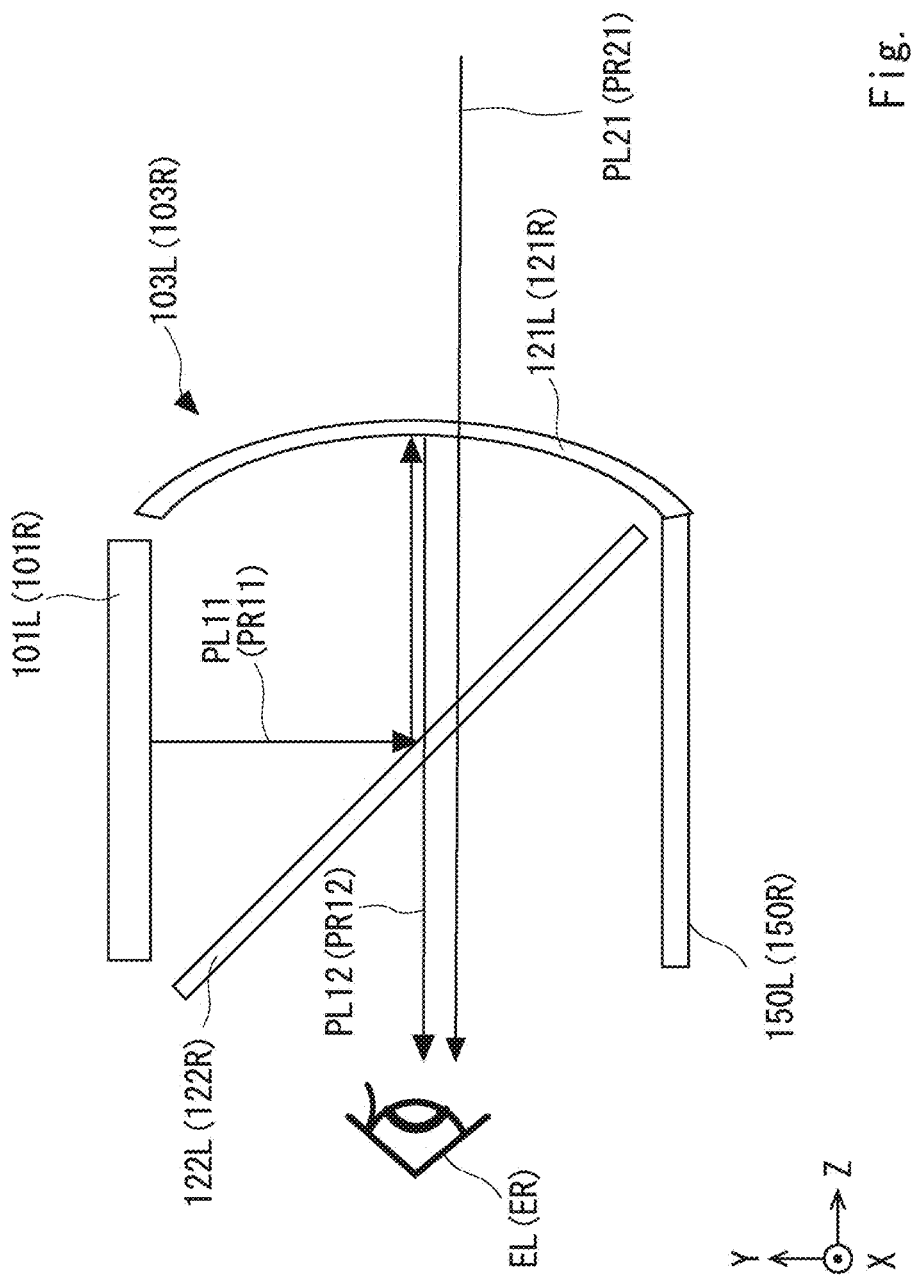
FIG. 3 is a view for describing display light and outside light in an optical system of a head-mounted display.

An example of the left-eye optical system 103L and the right-eye optical system 103R (which are collectively referred to simply as an optical system below) is described hereinafter. FIG. 3 is a side view schematically showing the optical system. Note that the left-eye optical system 103L and the right-eye optical system 103R have the same structure, and therefore mainly the left-eye optical system 103L is described with reference to FIG. 3.

The left-eye optical system 103L includes a combiner 121L, a beam splitter 122L, and a light shielding part 150L. The combiner 121L, the beam splitter 122L, and the light shielding part 150L are fixed to the frame 102 shown in FIG. 1.

The combiner 121L is a concave mirror, and the beam splitter 122L is a plane mirror. The combiner 121L and the beam splitter 122L are beam splitters such as half-mirrors, and reflect part of incident light and transmit part of incident light. When it is assumed that the percentage of reflection and the percentage of transmission in the combiner 121L are equal, the combiner 121L transmits approximately half of the amount of incident light, and reflects the remaining half. Likewise, when it is assumed that the percentage of reflection and the percentage of transmission in the beam splitter 122L are equal, the beam splitter 122L transmits approximately half of the amount of incident light, and reflects the remaining half. The combiner 121L and the beam splitter 122L may increase the percentage of reflection and decrease the percentage of transmission, or may decrease the percentage of reflection and increase the percentage of transmission.

The combiner 121L and the beam splitter 122L are arranged in front (+Z direction) of the user's left eye EL. Further, the combiner 121L is arranged in front (+Z direction) of the beam splitter 122L.

The left-eye display element 101L is arranged above (in the +Y direction) the beam splitter 122L. The left-eye display element 101L outputs the display light PL11 for forming a display image. Thus, the left-eye display element 101L is arranged diagonally above in front of the left eye EL.

The light shielding part 150L is arranged below (in the −Y direction) the beam splitter 122L. Thus, the light shielding part 150L is arranged diagonally below in front of the left eye EL. The light shielding part 150L is provided to shield a field of vision in the diagonally lower front. The light shielding part 150L is formed of a black material or the like that absorbs light. A lower window for viewing the diagonally lower front may be provided instead of the light shielding part 150L.

The display light PL11 from the left-eye display element 101L is described hereinafter. The display surface of the left-eye display element 101L faces vertically downward (in the −Y direction). Thus, the display light PL11 from the left-eye display element 101L is output in the −Y direction. The left-eye display element 101L is a liquid crystal monitor having a liquid crystal display panel, for example. The liquid crystal display panel controls the polarization state of light from a backlight and thereby spatially modulates the light.

The beam splitter 122L is arranged at an angle below (in the −Y direction) the left-eye display element 101L. The display light PL11 from the left-eye display element 101L enters the beam splitter 122L. The beam splitter 122L reflects part of the display light PL11. Further, the remaining part of the display light PL11 that has passed through the beam splitter 122L is absorbed by the light shielding part 150L.

The display light PL12 that has been reflected by the beam splitter 122L is reflected forward (in the +Z direction). Then, the display light PL11 that has been reflected by the beam splitter 122L enters the combiner 121L. The combiner 121L reflects part of the display light PL11 backward (in the −Z direction). The display light PL11 reflected by the combiner 121L is referred to as display light PL12. Further, the combiner 121L is a concave mirror, and reflects the display light PL12 so as to focus the display light PL12 toward the left eye EL. The display light PL12 that has been reflected by the combiner 121L enters the beam splitter 122L. The beam splitter 122L transmits part of the display light PL12.

The display light PL12 that has passed through the beam splitter 122L enters the left eye EL. In this manner, the left-eye optical system 103L guides the display light PL11 from the left-eye display element 101L to the user's left eye EL. The optical system can display the virtual image in front (in the +Z direction) of the user. Further, since a concave mirror is used as the combiner 121L, the display image is displayed in a larger scale.

The outside light PL21 from the front (+Z direction) of the user is described hereinafter. Part of the outside light PL21 passes through the combiner 121L. The outside light PL21 that has passed through the combiner 121L enters the beam splitter 122L. The beam splitter 122L transmits part of the outside light PL21. The outside light PL21 that has passed through the beam splitter 122L enters the left eye EL.

Since the head-mounted display 100 is semitransparent, the combiner 121L combines the outside light PL21 from the front (+Z direction) and the display light PL12 from the left-eye display element 101L. By arranging the combiner 121L in front (in the +Z direction) of the user, the head-mounted display 100 functions as an optical see-through display. A display image is superimposed on a view in front (in the +Z direction) of the user. The user is thereby able to see a view on which the display image is superimposed.

The right-eye optical system 103R has the combiner 121R, the beam splitter 122R, and the light shielding part 150R similarly to the left-eye optical system 103L. Thus, display light PR11 from the right-eye display element 101R is reflected by the beam splitter 122R and enters the combiner 121R. The combiner 121R combines the outside light PR21 from the front (+Z direction) and the display light PR12 from the right-eye display element 101R. Hereinafter, the right-eye optical system 103R and the left-eye optical system 103L will collectively be described as an optical system.

Figure 4:
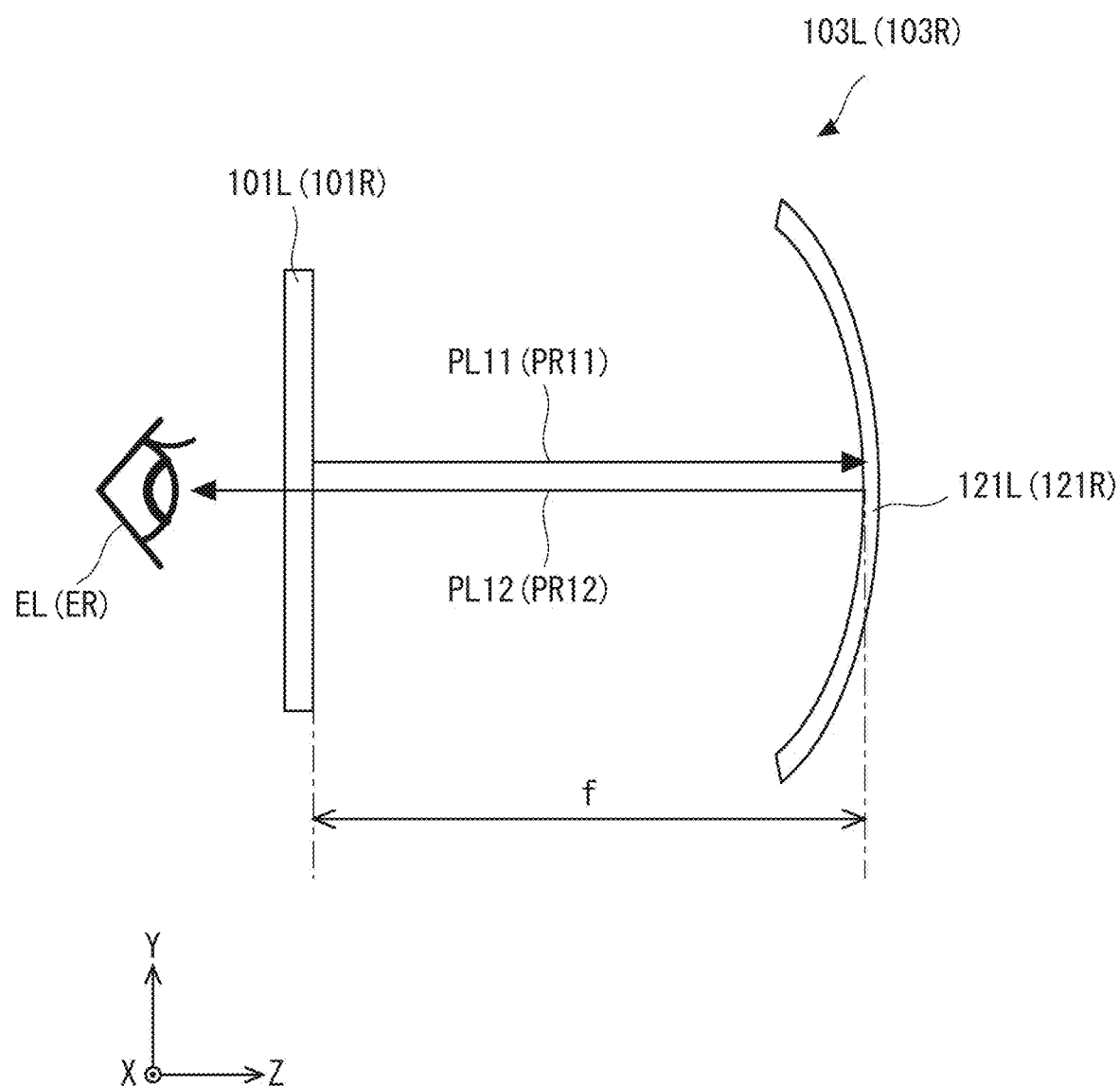
FIG. 4 is a schematic diagram showing an optical system in a simplified manner.

The combiners 121L and 121R are concave mirrors which are aspherical. In other words, the combiners 121L and 121R are aspherical mirrors. The focal lengths of the combiners 121L and 121R are denoted by f. FIG. 4 is a schematic diagram showing the optical system in a simplified manner. In FIG. 4, the beam splitters 122L and 122R are omitted for the sake of explanation. The following explanation will be given omitting the beam splitters 122L and 122R.

The left-eye display element 101L and the right-eye display element 101R are arranged at positions of substantially the distance f from the combiners 121L and 121R, respectively. In other words, the distance between the left-eye display element 101L and the combiner 121L substantially agrees with the focal length f, and the distance between the right-eye display element 101R and the combiner 121R substantially agrees with the focal length f.

Figure 5:
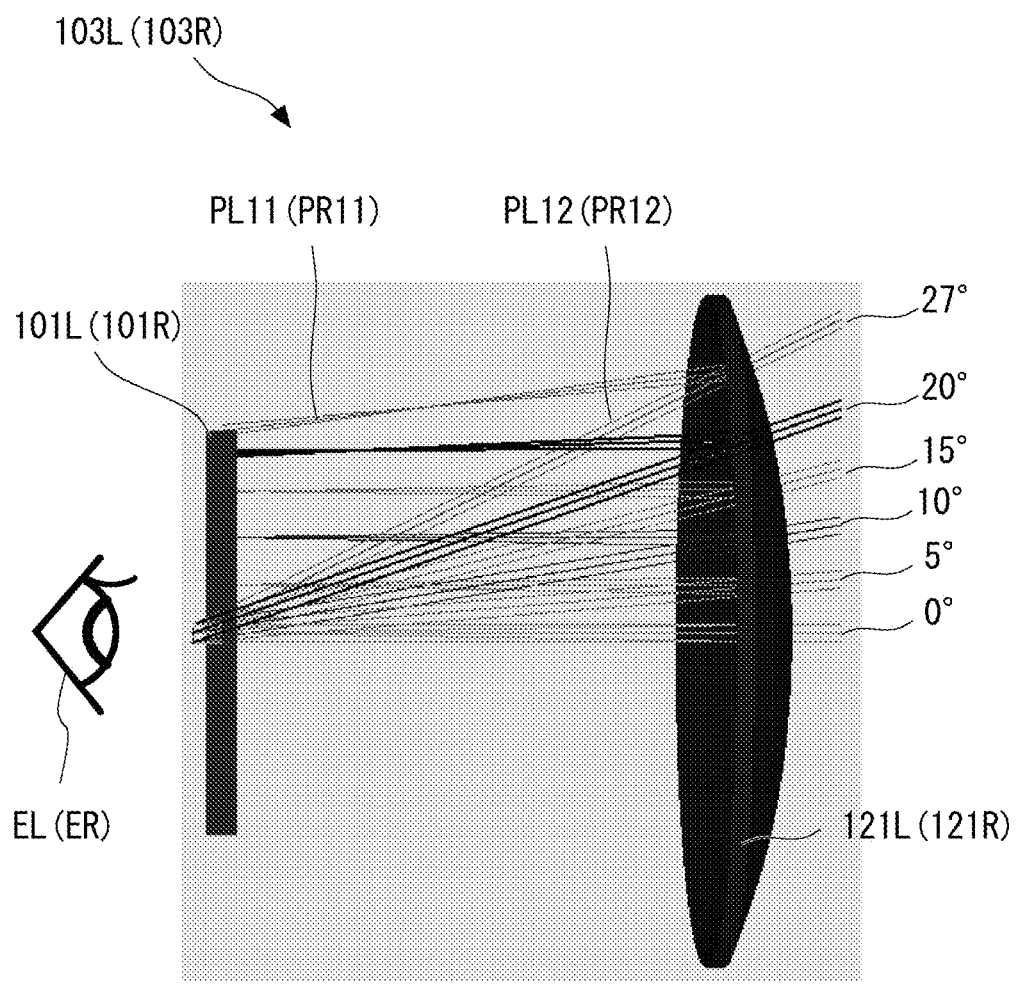
FIG. 5 is a light ray diagram of display light in the optical system.

As shown in FIG. 5, the display light PL11/PR11 output from a point of the left-eye display element 101L/the right-eye display element 101R spreads and enters the combiner 121L/121R. Then, the display light PL12/PR12 reflected by the combiner 121L/121R becomes parallel light fluxes. The display light PL11 output from a point of the left-eye display element 101L is reflected by the combiner 121L to become parallel light fluxes, and enters the left eye EL. The display light PR11 output from a point of the right-eye display element 101R is reflected by the combiner 121R to become parallel light fluxes, and enters the right eye ER. Note that FIG. 5 is a light ray diagram showing simulation results at viewing angles of 0°, 5°, 10°, 15°, 20°, and 27° in the up-down direction (the Y direction). Herein, the viewing angles refer to angles extended radially from the left eye EL and the right eye ER. Thus, the display light PL12 and PR12 reflected by the combiners 121L and 121R become substantially parallel light fluxes at the respective viewing angles.

Figure 6:
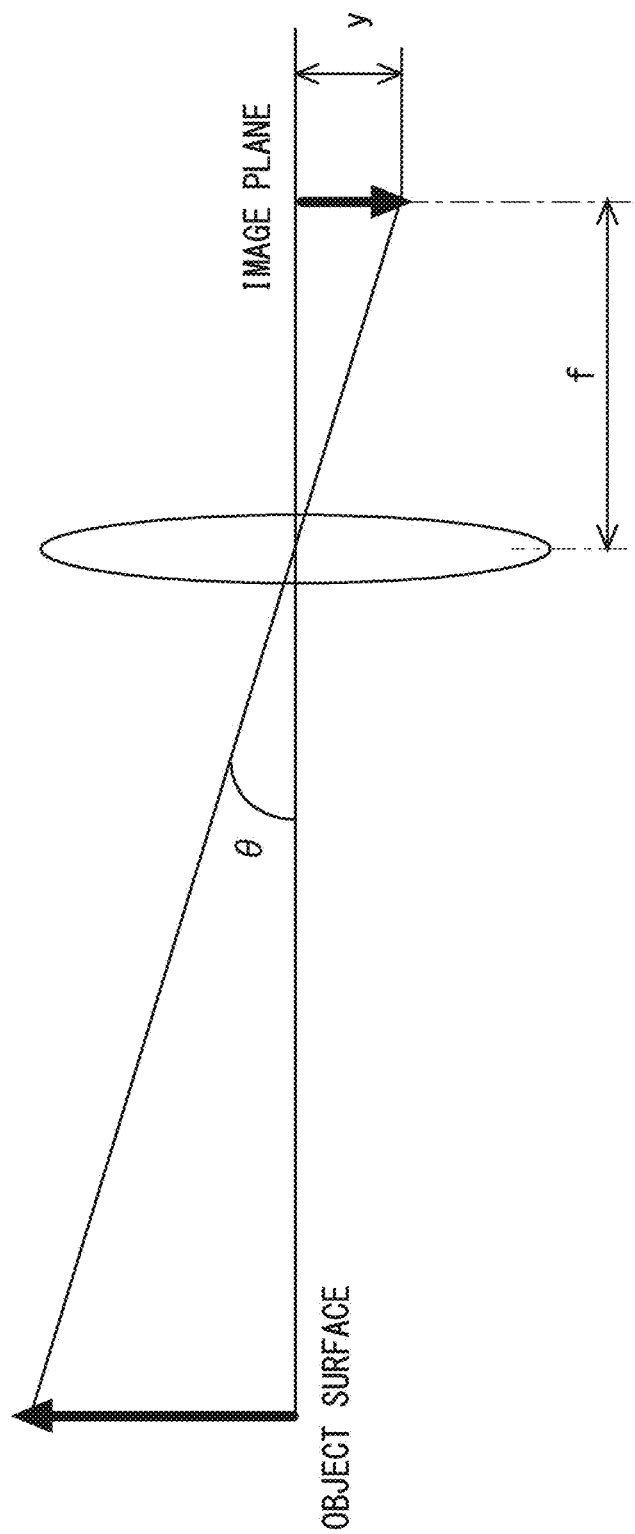
FIG. 6 is a diagram for describing a relationship between image height (display element size) and viewing angle (half angular field of view).

An imaging function of the left eye EL and the right eye ER enables a user to see display images of the left-eye display element 101L and the right-eye display element 101R. FIG. 6 is a diagram for describing a relationship between an object (object surface) and an image height. FIG. 6 shows an imaging optical system of a convex lens having the focal length f. In this case, a relationship between an image height y and an angular field of view θ on an image plane is expressed by Expression (1) below.

$$y = f \times \tan\theta \quad (1)$$

When applying the above relationship to the optical system in FIG. 3 and FIG. 4, the focal length f of the lenses is equivalent to the focal length f of the concave mirrors (the combiners 121L and 121R). The image height y is equivalent to a distance from the centers (optical axes of the optical system) of the left-eye display element 101L and the right-eye display element 101R. The angular field of view θ is equivalent to the viewing angle.

Expression (2) is obtained from Expression (1).

$$\theta = \arctan(y/f) \quad (2)$$

By increasing the image height y, the viewing angle θ can be increased. However, the image height y depends on a display element size (panel size) of the left-eye display element 101L and the right-eye display element 101R, and is therefore difficult to increase to be more than or equal to a certain value. In a case in which the left-eye display element 101L and the right-eye display element 101R are display elements having a large aspect ratio in the left-right direction (the X direction), the image height y depends on the display element size (panel size) in the left-right direction (the X direction) of the left-eye display element 101L and the right-eye display element 101R.

In addition, by reducing the focal length f of a concave mirror, the viewing angle θ can be increased. However, when the focal length f of the concave mirrors is reduced, the entire optical system becomes smaller. For example, in order to reduce an optical distance between the left-eye display element 101L and the combiner 121L, the left-eye display element 101L needs to be lowered downward (in the −Y direction). If the left-eye display element 101L is lowered excessively, a component of a viewing angle which is larger in the +Y direction, of the display light PL12 reflected by the combiner 121L, will interfere with the left-eye display element 101L. In other words, the user will not be able to see the vicinity of an upper end (an end on the +Y side) of a virtual image of the display image. This makes it difficult to widen the viewing angle. In the present embodiment, the distortion is increased outside the effective viewing field so as to widen the viewing angle.

Although the human viewing field is approximately 200° in the left-right direction and 135° in the up-down direction, a distinguishable viewing field in which good eyesight can be obtained in a state in which eyes remain still is approximately several degrees. In addition, an effective viewing field in which good eyesight can be obtained with normal eye movements is within about 15° in each of the left and right directions, within about 8° in the up direction, and within about 12° in the down direction. In a case of looking at the outside of the effective viewing field, the user naturally looks at it with a head movement. Therefore, in the present embodiment, a range in the effective viewing field is displayed at a high image quality, while the outside of the effective viewing field is displayed at a lower image quality, thereby achieving both a substantial high image quality and reduction in cost and size.

In general, the effective viewing field ranges within about 15° in each of the left and right directions, within about 8° in the up direction, and within about 12° in the down direction. Herein, a viewing angle corresponding to the effective viewing field will be described as 15° in accordance with the viewing angle of the effective viewing field in the left-right direction which is larger than in the up-down direction. In other words, the effective viewing field is set at a range within 15° in each of the up-down direction and the left-right direction. A viewing angle corresponding to the effective viewing field is used as the effective viewing angle. The effective viewing angle corresponds to the maximum angle of the effective viewing field in the left-right direction. Although the present embodiment will describe the effective viewing angle as 15°, the effective viewing angle is not limited to this value. In addition, the combiner 121L and the combiner 121R are arranged from the insides to the outsides of the effective viewing fields of the left eye EL and the right eye ER, respectively. In other words, portions close to the optical axes of the combiner 121L and the combiner 121R are located inside the effective viewing fields, and portions away from the optical axes of the combiner 121L and the combiner 121R are located outside the effective viewing fields. For example, only the central portions of the combiners 121L and 121R may be located inside the effective viewing fields, and peripheral portions of the combiners 121L and 121R may be located outside the effective viewing fields.

In the optical system, in a range inside the effective viewing angle corresponding to the effective viewing field of an eye of the user, the distortion is less than or equal to a certain value. For example, the certain value is set at 5% which is generally held to be a limit that enables the user to see without discomfort. On the other hand, in a range outside the effective viewing angle, the distortion increases toward an outside of the viewing field. At a viewing angle less than the effective viewing angle, the distortion is reduced because the user can see a display image or a view with good eyesight. In a case of seeing a view at a viewing angle of more than or equal to the effective viewing angle, the user cannot obtain good eyesight unless turning his/her head. Therefore, the user turns his/her head such that a view he/she wants to see falls within the effective viewing field. At or above the effective viewing angle, degradation of display quality can be prevented even if the distortion is increased.

Figure 7:
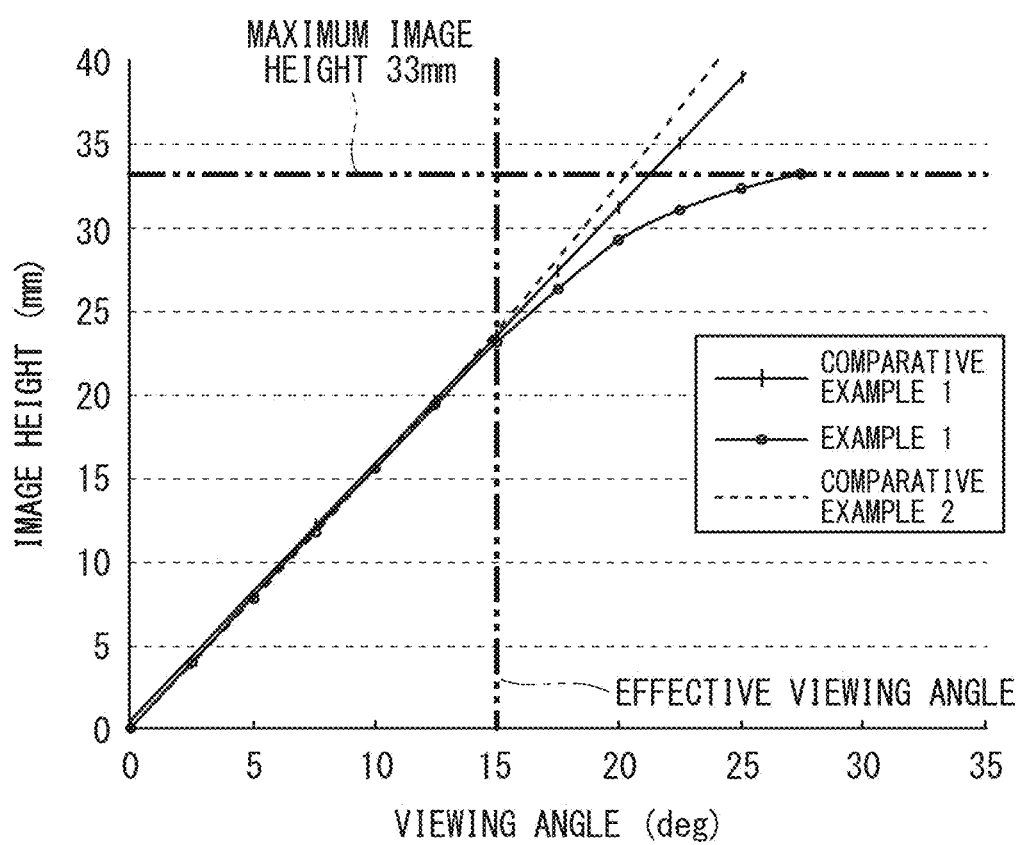
FIG. 7 is a graph showing simulation results of image height properties in the optical system of a first embodiment.
Figure 8:
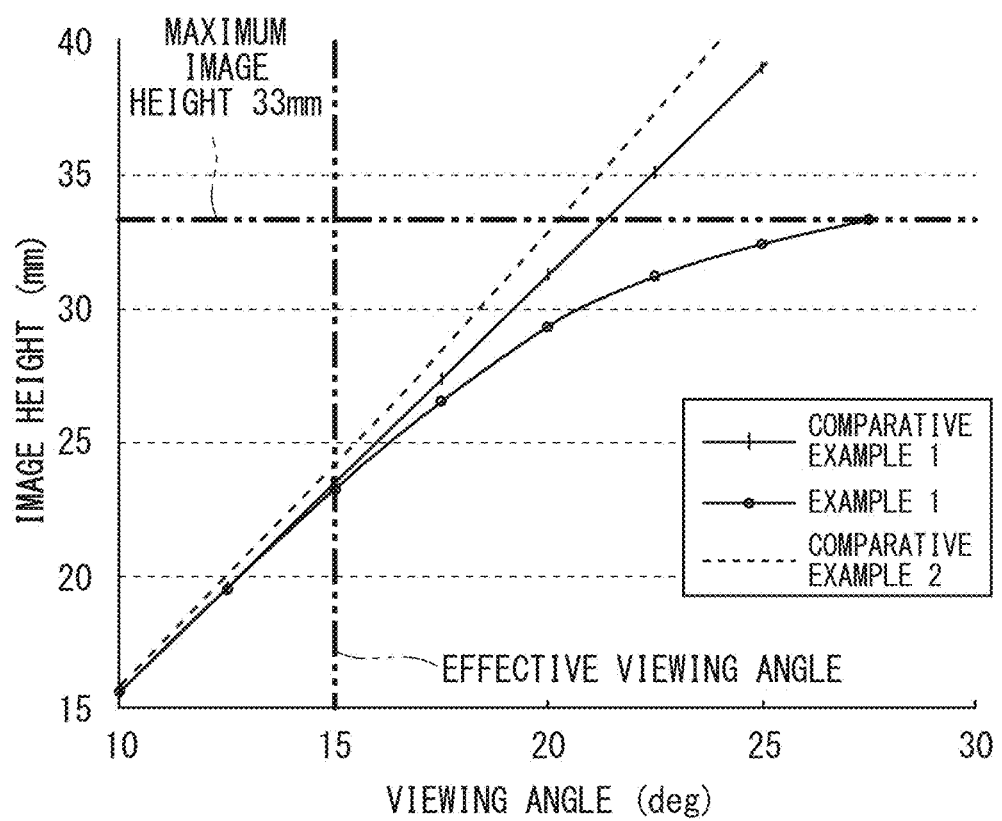
FIG. 8 is an enlarged view of part of FIG. 7.

FIG. 7 is a graph of simulation results of image height properties, showing a relationship between viewing angle and image height. FIG. 8 is an enlarged view obtained by enlarging part of FIG. 7. The horizontal axis indicates the viewing angle, and the vertical axis indicates the image height. The image height property is a property indicating changes in the image height with respect to the viewing angle.

The image height corresponds to a distance from the optical axis of the left-eye display element 101L or the right-eye display element 101R in the left-right direction (the X direction). For example, in a case in which the optical system is designed with the optical axis located at the panel center, the image height corresponds to a distance from the panel center of the left-eye display element 101L or the right-eye display element 101R in the left-right direction (the X direction). A viewing angle of 0° corresponds to an image height of 0 mm, that is, the panel center. A viewing angle of 15° corresponds to a distance of about 23 mm from the panel center. In addition, since the display panel size of the left-eye display element 101L or the right-eye display element 101R in the left-right direction (the X direction) is set at 66 mm, the half width is 33 mm. The size from the panel center to the left end or the right end is 33 mm. In other words, the maximum image height is 33 mm. A viewing angle corresponding to 33 mm is the maximum viewing angle (the maximum display angular field of view) in the left-right direction (the X direction).

FIG. 7 and FIG. 8 show simulation results of Example 1 and Comparative Examples 1 and 2. Comparative Example 1 shows an image height property in a spherical mirror having a radius of curvature R=−180 mm, that is, f=90 mm, which is not an aspherical mirror, and Comparative Example 2 shows an image height property of y=f*tan θ in Expression (1) in a case in which f=90 mm. Comparative Example 2 has an image height property in an ideal optical system having no distortion. The image height in Comparative Example 2 is an ideal image height.

In Comparative Examples 1 and 2, the image height properties are substantially linear. In other words, in Comparative Examples 1 and 2, the graphs of the image height properties have substantially constant inclinations. Since Comparative Example 1 has a slight distortion, the inclination of the graph of Comparative Example 1 is smaller than the inclination of the graph of Comparative Example 2. Since the image height of 33 mm corresponds to the maximum viewing angle, the maximum viewing angle of Comparative Example 1 is 22°, and the maximum viewing angle of Comparative Example 2 is 21°.

In Example 1, the relationship between the viewing angle and the image height is substantially linear up to the vicinity of the effective viewing angle. However, when the viewing angle exceeds the effective viewing angle, the relationship between the viewing angle and the image height is not linear in Example 1. To be specific, at a viewing angle of more than or equal to 15°, the inclination of the graph of Example 1 becomes smaller than those of Comparative Examples 1 and 2. Furthermore, as the viewing angle increases, the inclination gradually decreases. The graph of the image height property starts curving gradually in the vicinity of the effective viewing angle of 15°, and departs from the image height property (ideal image height) of Comparative Example 2 as the viewing angle increases. In this manner, at or above the effective viewing angle, the distortion gradually increases as the viewing angle increases.

In the present embodiment, when the viewing angle exceeds the effective viewing angle, an increase in the image height with respect to an increase in the viewing angle decreases. Furthermore, as the viewing angle increases, the inclination of the graph of the image height property decreases. With such a configuration, the maximum viewing angle can be increased. In Example 1, the maximum viewing angle corresponding to the image height of 33 mm is about 27°. According to Example 1, the viewing angle becomes wider than that of Comparative Example 1 which is a spherical mirror by approximately 5°. In Example 1, the viewing angle can be made wider than that of Comparative Example 1 by about 23%. Note that at a viewing angle less than or equal to the effective viewing angle, the image height property of Example 1 is substantially equivalent to the image height properties of Comparative Examples 1 and 2. Although the image height property of the display element unit 101 in the left-right direction (the X direction) has been described so far, the display element unit 101 has a similar image height property in the up-down direction as well. In other words, when the viewing angle exceeds the effective viewing angle, an increase in the image height with respect to an increase in the viewing angle decreases in the up-down direction of the display element unit 101 as well. However, since the panel size of the display element unit 101 has an aspect ratio larger in the left-right direction (the X direction), the maximum viewing angle in the up-down direction is smaller than 27° which is the maximum viewing angle in the left-right direction (the X direction).

Hereinafter, a shape of a reflecting surface of the concave mirror will be described. A sag amount of the concave mirror is denoted by Z. The sag amount Z indicates a profile shape of the reflecting surface of the aspherical mirror. A radial distance from the optical axis in a plane orthogonal to the optical axis is denoted by r. The sag amount Z is a distance in the Z direction from the vertex of the aspherical mirror to the reflecting surface. To be specific, the sag amount Z is expressed as a function of r as in Expression (3) below.

[Ex. 1]

$$Z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} \quad (3)$$

A curvature (reciprocal of the radius of curvature R) is denoted by c, a conic constant is denoted by k, and an aspherical coefficient is denoted by $\alpha n$. A second-order aspherical coefficient is denoted by $\alpha 1$, a fourth-order aspherical coefficient is denoted by $\alpha 2$, a sixth-order aspherical coefficient is denoted by $\alpha 3$, an eighth-order aspherical coefficient is denoted by $\alpha 4$, and a tenth-order aspherical coefficient is denoted by $\alpha 5$. The shape of the concave mirror which is aspherical can be defined using c, k, and $\alpha 1$ to $\alpha 5$. In this manner, the sag amount Z changes in accordance with r.

In Example 1, the curvature c, the conic constant k, and the aspherical coefficients $\alpha 1$ to $\alpha 5$ are set at values shown in the table in FIG. 9. The curvature c is the reciprocal of R=−180. The first-order to third-order aspherical coefficients $\alpha 1$ to $\alpha 3$ are zero. In addition, the conic constant k is also zero.

By setting the aspherical coefficients as shown in FIG. 9, only an outer portion of the concave mirror can be bent such that the radius of curvature decreases. As shown in FIG. 7 and FIG. 8, the distortion is increased only outside the effective viewing field. This means that the concave mirror is bent such that the inside of the effective viewing field has a spherical shape which substantially serves as a base and has the radius of curvature R=−180 mm, and the outside of the vicinity of the effective viewing angle has an aspherical shape such that the radius of curvature becomes smaller.

If the conic constant k and low-order (e.g., the second-order to sixth-order) aspherical coefficients are used, the radius of curvature may possibly become smaller than that of the spherical shape on an inner side. In this case, it is difficult to obtain image height properties as shown in FIG. 7 and FIG. 8. If the distortion increases inside the effective viewing field, a display property will be degraded. Thus, in Example 1, the conic constant k is set at zero, and the second-order to sixth-order aspherical coefficients $\alpha 1$ to $\alpha 3$ are set at zero.

Figure 10:
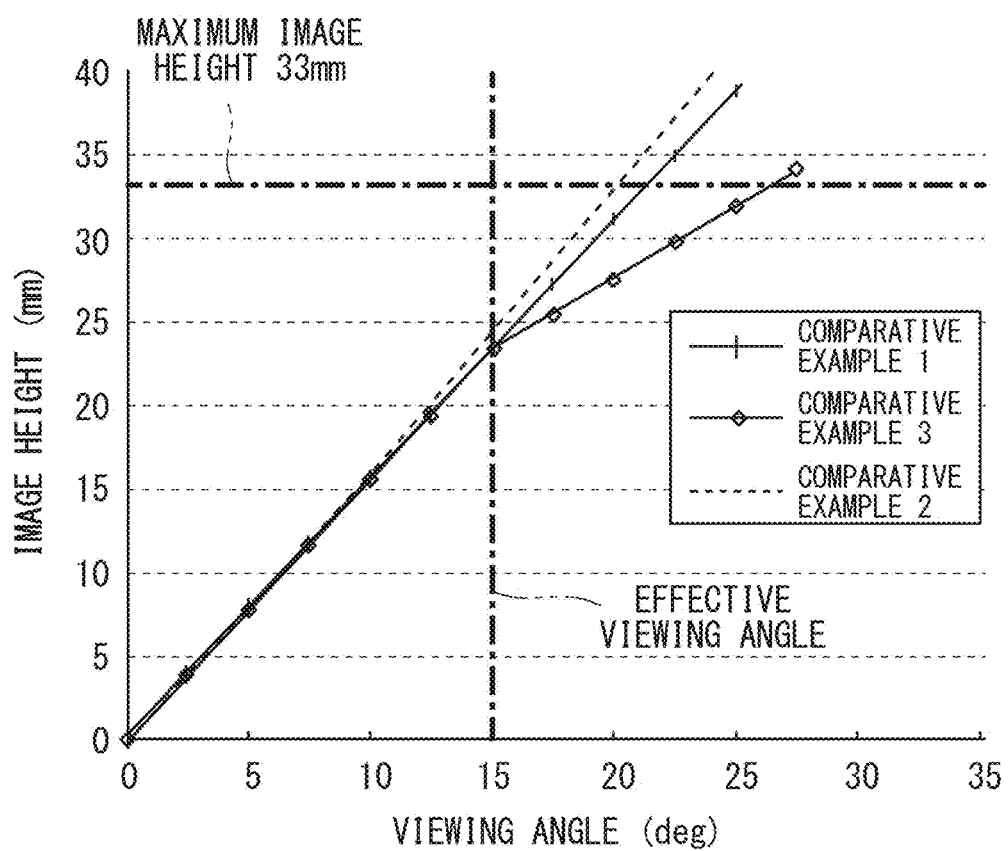
FIG. 10 is a graph showing simulation results of an image height property in an optical system of Comparative Example 3.

Next, the shapes of the image height properties will be described. In a case of making the distortion larger than in the spherical surface serving as a base, adopting a shape like that of Comparative Example 3 shown in FIG. 10 can also be considered. In Comparative Example 3, the image height property changes linearly at the vicinity of the effective viewing angle. For setting the shape as in Comparative Example 3, a spherical shape having a smaller radius of curvature is adopted at or above the effective viewing angle. To be specific, the radius of curvature R=−180 below the effective viewing angle, and a radius of curvature Ro=R× 0.55 (=−180×0.55) at or above the effective viewing angle. Note that in FIG. 10, Comparative Examples 1 and 2 are the same as those in FIG. 7 and FIG. 8.

In Comparative Example 3, however, the shape of the curved surface changes discontinuously across the effective viewing angle, which may cause unnaturalness in a display image. In other words, the display image may cause discomfort in the vicinity of the boundary of the effective viewing field. Therefore, in the present embodiment, it is preferable to change the image height smoothly across the effective viewing angle. To be specific, it is preferable to use what is called a relaxation curve as a curve outside the effective viewing angle. In other words, the image height property has a relaxation curve shape in the range outside the effective viewing angle. The relaxation curve includes a clothoid curve, a cubic curve, and the like. Herein, a relaxation curve is created more simply by setting an amount of changes inside the effective viewing angle at an amount of changes gradually reduced by a certain coefficient. Through the use of such a relaxation curve, the shape of the curved surface of the concave mirror changes smoothly across the effective viewing angle. This enables a display image to continue naturally across the effective viewing angle. Degradation of display quality can thereby be prevented.

Figure 11:
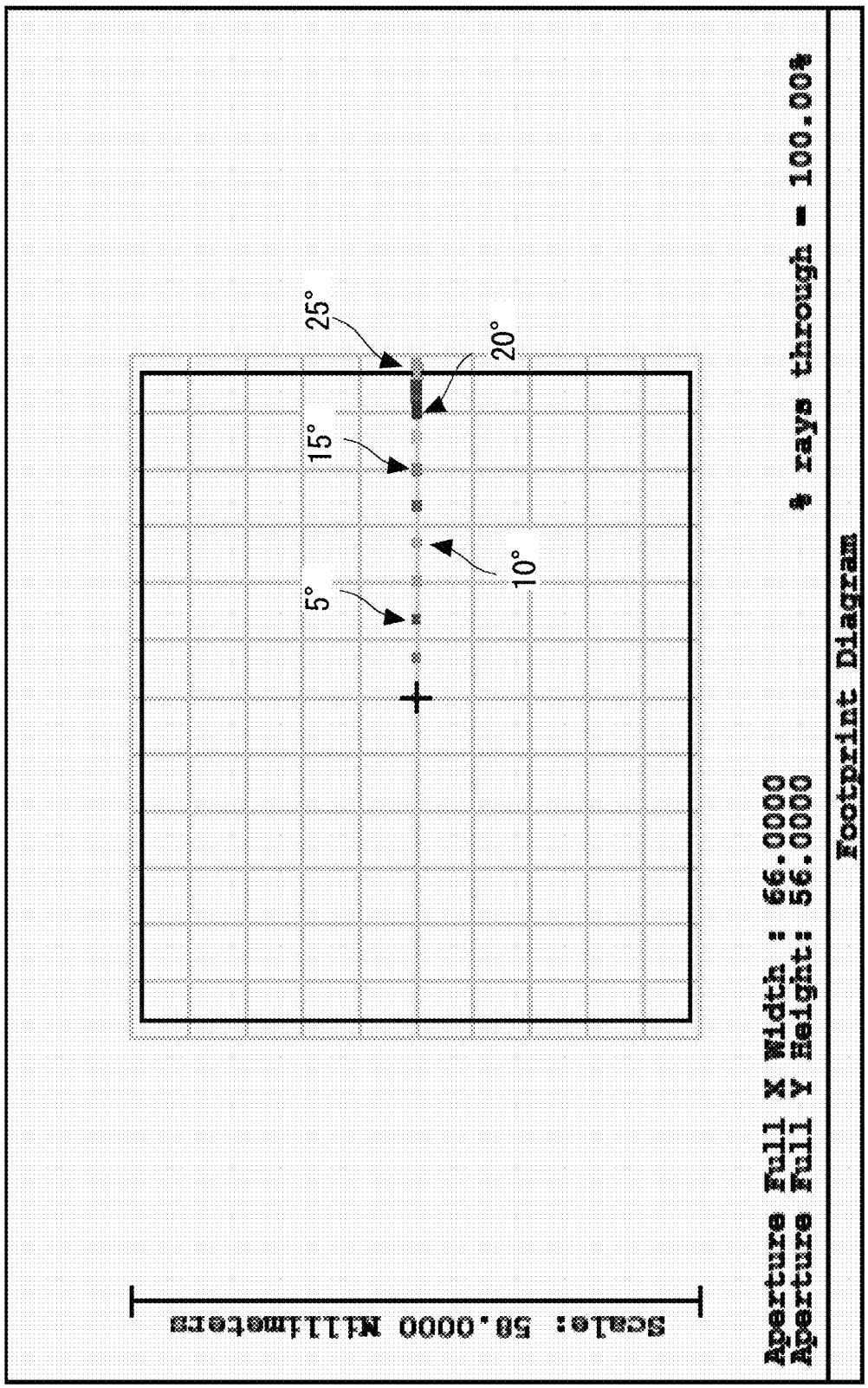
FIG. 11 is a diagram describing a distortion of the optical system.

Spot positions on a display panel in the optical system designed in this manner are shown in FIG. 11. In FIG. 11, the positions of spots by 2.5° in the left-right direction (the X direction) on the concave mirror of Example 1 are shown. Herein, a result of performing simulations in a range of viewing angles of 0° to 25° is shown. When the effective viewing angle is less than or equal to 15°, spots are aligned at substantially regular intervals, but when the effective viewing angle exceeds 15°, the spot interval gradually decreases. Thus, the above-described distortion property can be achieved. Note that in FIG. 11, the panel size is set at 58 mm high and 66 mm wide.

Figure 12:
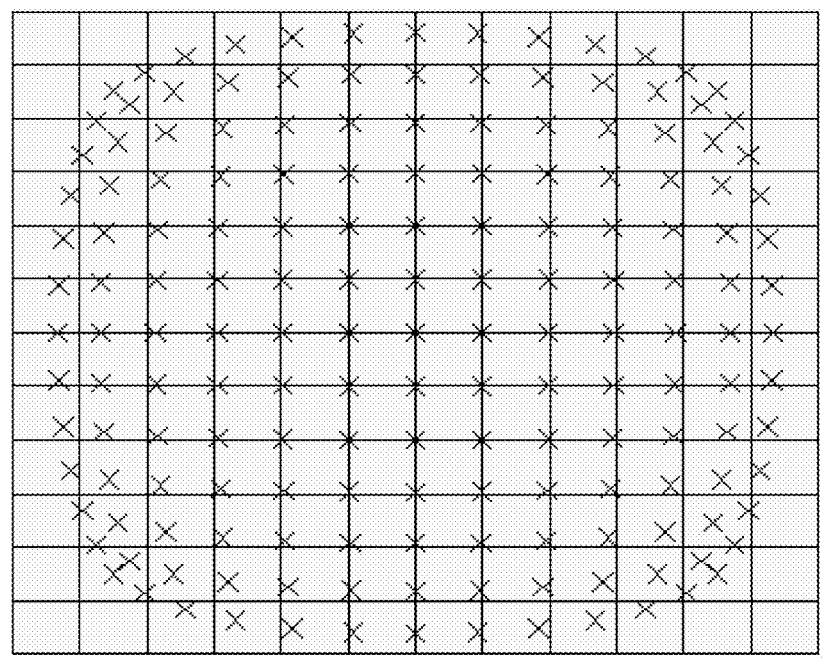
FIG. 12 is a diagram showing the distortion of the optical system.

FIG. 12 is a diagram showing a distortion property on the display panel. As shown in FIG. 12, the distortion has what is called a barrel shape. In other words, it looks like bulging outward from the center.

Figure 13:
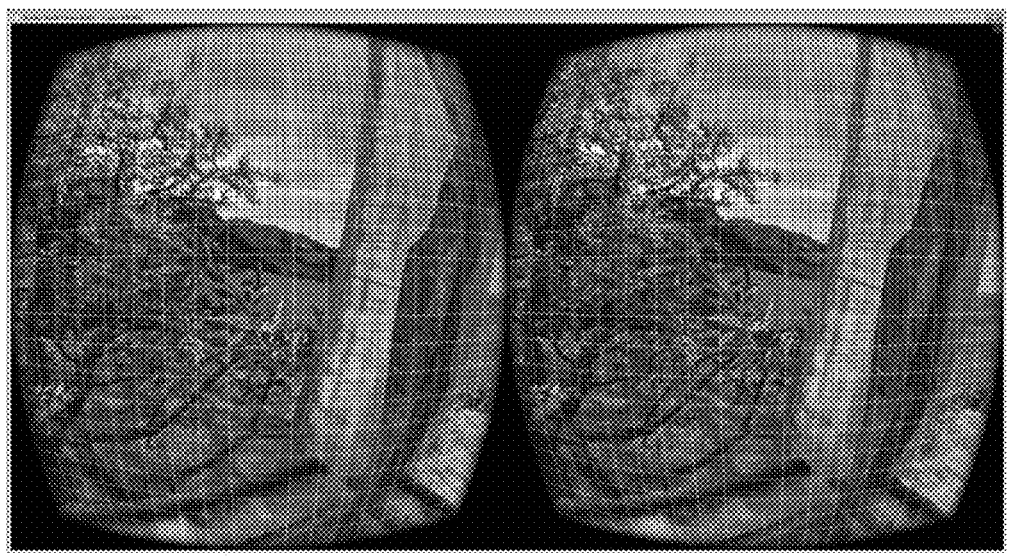
FIG. 13 is a view showing display images corrected in accordance with the distortion of the optical system.

A display image formed by the left-eye display element 101L or the right-eye display element 101R preferably is subjected to correction in accordance with the distortion property of the optical system. The control unit 105 forms a display image such that the display image is distorted in accordance with the distortion as shown in FIG. 12. The control unit 105 achieves formation of a distorted display image utilizing software or hardware. FIG. 13 is a view showing an example of left and right display images subjected to correction in accordance with the distortion. FIG. 13 shows display images obtained by seeing left and right display images corrected in accordance with the distortion of the optical system, without the interposition of the optical system.

The control unit 105 forms a display image bulging outward from the center as shown in FIG. 13. The display element unit 101 displays a display image distorted in a manner equivalent to the distortion of the optical system. In other words, the control unit 105 corrects the display image such that the display element unit 101 forms a display image distorted in accordance with the distortion of the optical system. By seeing the distorted display image through the optical system, the user is able to see an appropriate display image. The display quality can thereby be improved.

According to the above-described configuration, the display quality can be improved. Even in a case of using a general display panel having uniform pixels, a chromatic aberration-free, clear, and very high image quality can be obtained inside the effective viewing field. In addition, outside the effective viewing field, a wider viewing angle can be obtained in practice by gradually increasing the distortion. Furthermore, a display image can be made continuous naturally at the boundary portion of the effective viewing field.

Second Embodiment

In the present second embodiment, the reflecting surfaces of the combiners 121L and 121R have different shapes. To be specific, in the second embodiment, the fourth-order and sixth-order aspherical coefficients α2 and α3 shown in Expression (3) are not zero. Note that the basic configuration of the head-mounted display 100 is similar to that of the first embodiment, and explanation is thus omitted.

Hereinafter, a result of performing simulations with the radius of curvature R changed will be described. In Example 2, the radius of curvature R=−180 mm, and in Example 3, the radius of curvature R=−150 mm. In the optical systems of Example 2 and Example 3, the conic constant k and the aspherical coefficients α2 to α5 have values shown in the table in FIG. 14. Note that k=0 and α1=0. The reciprocal of each of the radii of curvature is denoted by c.

Figure 15:
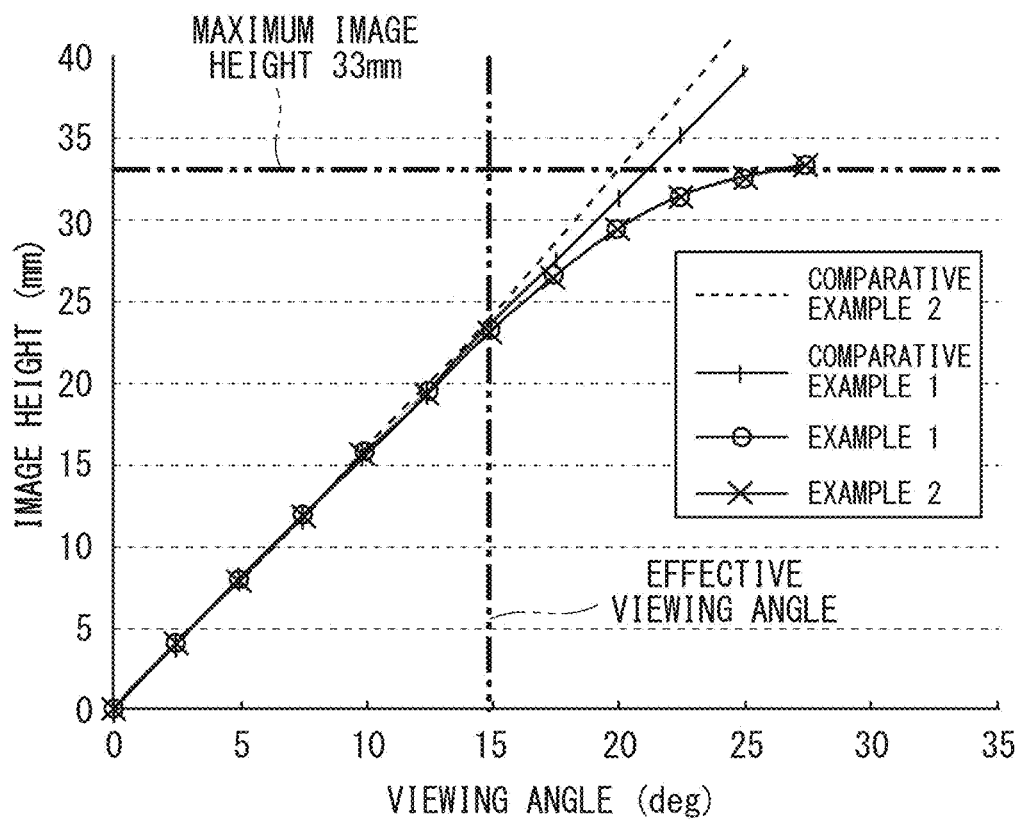
FIG. 15 is a graph showing simulation results of image height properties in a second embodiment.
Figure 16:
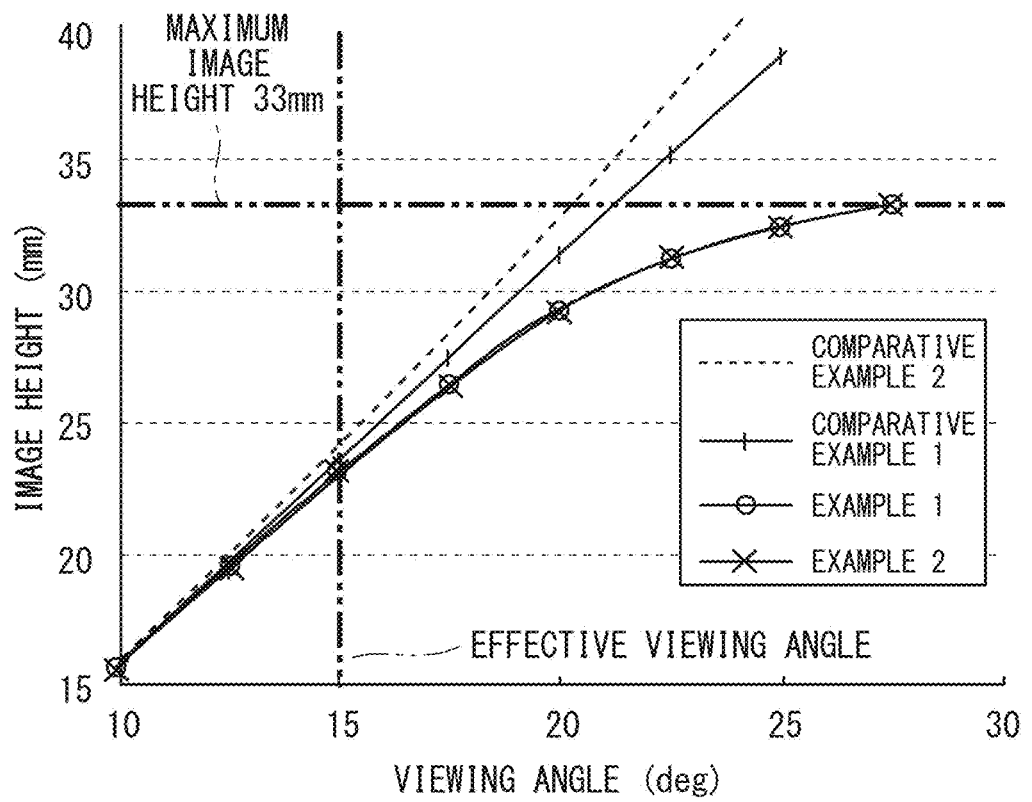
FIG. 16 is an enlarged view of part of FIG. 15.

Image height properties in an optical system according to the second embodiment are shown in FIG. 15. FIG. 16 is a graph showing FIG. 15 in an enlarged manner. FIG. 15 and FIG. 16 are graphs showing Examples 1 and 2 and Comparative Examples 1 and 2. In FIG. 15 and FIG. 16, Example 1 and Comparative Examples 1 and 2 are similar to those in FIG. 7 and FIG. 8. In addition, similarly to the first embodiment, the effective viewing angle is 15°, and the maximum image height is 33 mm.

In Example 2, the image height property is substantially linear at or below the effective viewing angle, and is a relaxation curve property above the effective viewing angle. In other words, in the range outside the effective viewing angle, the image height property has a relaxation curve shape. It is appreciated that the distortion gradually increases above the effective viewing angle. In other words, similarly to the first embodiment, the distortion gradually increases toward the outside of the viewing field in the range outside the effective viewing angle. Thus, effects similar to those of the first embodiment can be obtained.

Figure 17:
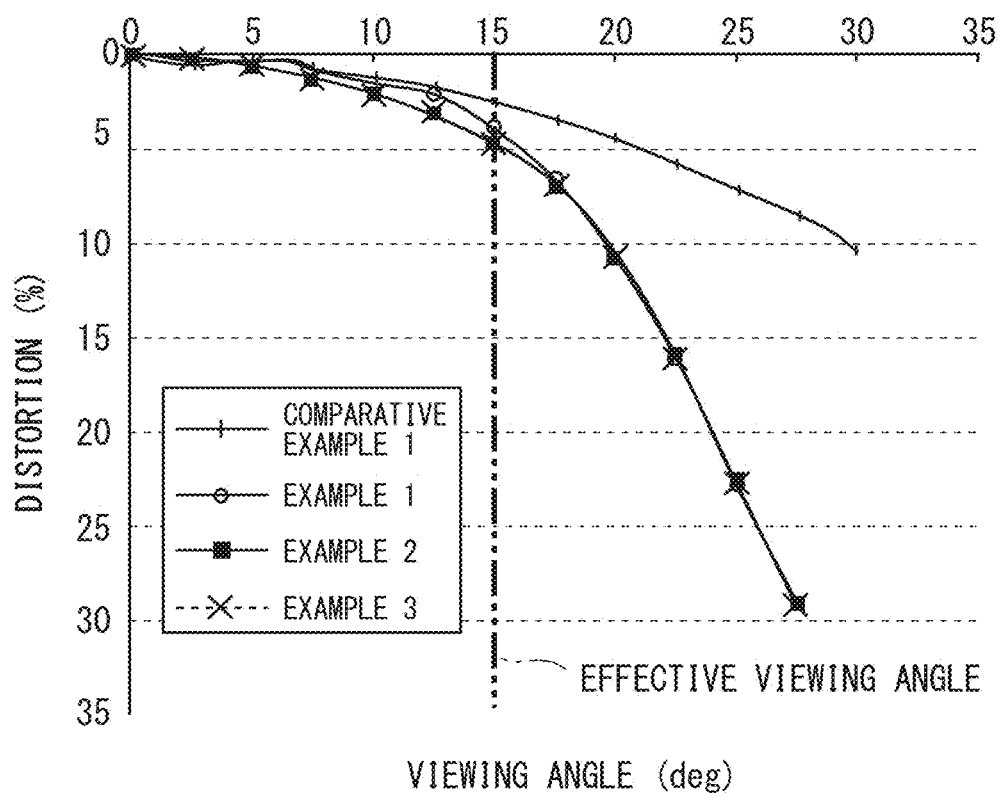
FIG. 17 is a graph showing a relationship between viewing angle and distortion.

Since y=f*tan θ in Comparative Example 2, y in Comparative Example 2 becomes the ideal image height. The distortion is defined by a gap amount between the ideal image height and an actual image height, and expressed as distortion (%)=100×(y−A)/A where A denotes the actual image height A in the optical system. FIG. 17 is a graph showing a relationship between viewing angle and distortion (%). FIG. 17 shows simulation results in Comparative Example 1 and Examples 1 to 3.

FIG. 17 shows results of simulations in a case of changing the viewing angle at intervals of 2.5°. In the simulations, the distortion (%) at a viewing angle at the intervals of 2.5° is calculated. FIG. 17 is a graph showing simulation results of Examples 1 to 3 and Comparative Example 1.

In Examples 1 to 3, the distortion is less than or equal to 5% at or below the effective viewing angle. In other words, in Examples 1 to 3, the distortion exceeds 5% in the whole range in which the viewing angle is more than or equal to 20°. On the other hand, in Comparative Example 1, the distortion is less than or equal to 5% when the viewing angle is less than or equal to 20°. In this manner, it is preferable to increase the distortion at or above the effective viewing angle corresponding to the effective viewing field. In this manner, the distortion is set at less than or equal to 5% in the range inside the effective viewing angle. Thus, the angular field of view (viewing angle) can be widened.

FIG. 18 includes tables showing an example of aspherical coefficients in the optical system of the present embodiment. FIG. 18 shows an example of aspherical coefficients exhibiting favorable distortion properties obtained as a result of simulations. FIG. 18 shows an example of aspherical coefficients when R=−100 mm, −120 mm, −150 mm, −180 mm, and −200 mm. Hereinafter, the case in which R=−100 mm is denoted by R-100, the case in which R=−120 mm is denoted by R-120, the case in which R=−150 mm is denoted by R-150, the case in which R=−180 mm is denoted by R-180, and the case in which R=−200 mm is denoted by R-200. FIG. 18 shows aspherical coefficients and absolute values of the aspherical coefficients as tables, respectively. Through the use of the aspherical coefficients shown in the tables in FIG. 18, a favorable optical system can be obtained. Note that α1=0 and k=0.

Figure 19:
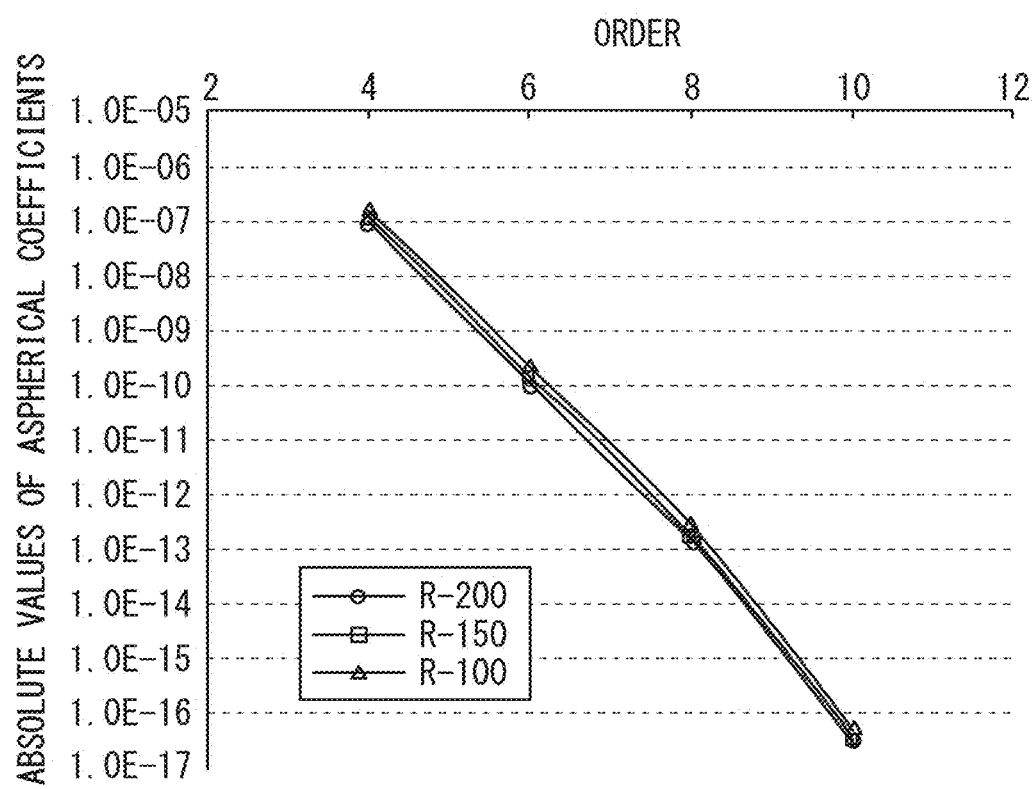
FIG. 19 is a graph showing aspherical coefficients in a case in which R=−100, −150, and −200.

FIG. 19 is obtained by graphing the absolute values of the aspherical coefficients in the tables in FIG. 18. FIG. 19 is a graph showing a relationship between orders and the absolute values of the aspherical coefficients. FIG. 19 shows aspherical coefficients having the fourth-order, sixth-order, eighth-order, and tenth-order aspherical orders, namely, $\alpha 2$, $\alpha 3$, $\alpha 4$, and $\alpha 5$. Herein, the aspherical coefficients $\alpha 2$, $\alpha 3$, $\alpha 4$, and $\alpha 5$ in the case in which R=−100, −150, and −200 are shown. The reason why the absolute values are described is because, when the Z direction, that is, a direction of the curved surface of the concave mirror, is inverted, both the sign of the radius of curvature R and the sign of the aspherical coefficients are also inverted.

By setting the absolute value of the fourth-order aspherical coefficient $\alpha 2$ and the absolute value of the sixth-order aspherical coefficient $\alpha 3$ at relatively small values, a desired distortion property can easily be obtained. For example, the absolute value of the fourth-order aspherical coefficient $\alpha 2$ preferably is less than or equal to $1.735 \times 10^{-7}$. For example, the absolute value of the sixth-order aspherical coefficient $\alpha 3$ preferably is less than or equal to $2.151 \times 10^{-10}$. As a result of performing many simulations, a favorable property is obtained by setting the aspherical coefficients to fall within the above-described ranges.

The absolute value of the fourth-order aspherical coefficient $\alpha 2$ preferably is more than or equal to $8.049 \times 10^{-8}$ and less than or equal to $1.735 \times 10^{-7}$. The absolute value of the sixth-order aspherical coefficient $\alpha 3$ preferably is more than or equal to $9.832 \times 10^{-11}$ and less than or equal to $2.151 \times 10^{-10}$. The absolute value of the eighth-order aspherical coefficient $\alpha 4$ preferably is more than or equal to $1.181 \times 10^{-13}$ and less than or equal to $2.432 \times 10^{-13}$. The absolute value of the tenth-order aspherical coefficient $\alpha 5$ preferably is more than or equal to $2.687 \times 10^{-17}$ and less than or equal to $5.656 \times 10^{-17}$. As a result of performing many simulations, a favorable property is obtained by setting the aspherical coefficients to fall within the above-described ranges.

Note that although the head-mounted display 100 is described as an optical see-through head-mounted display, the head-mounted display 100 may be a non-transmissive head-mounted display. In the case of a non-transmissive head-mounted display, reflective mirrors are provided instead of the combiners 121L and 121R. In other words, concave mirrors arranged in front of the beam splitters 122L and 122R may be beam splitters such as half mirrors, or may be reflective mirrors. The concave mirrors reflect display light toward the user.

Although the embodiments of the invention made by the present inventors are described in the foregoing, the present invention is not restricted to the above-described embodiments, and various changes and modifications may be made without departing from the scope of the invention. Two or more of the above-described embodiments may be combined as appropriate.

The present disclosure is applicable to a head-mounted display.

What is claimed is:

1. A head-mounted display comprising:
a display element configured to emit a display light for forming a display image;
a concave mirror which is aspherical, arranged in front of a user, and configured to reflect the display light toward the user; and
a beam splitter which is arranged between the concave mirror and the user, and configured to reflect the display light emitted from the display element to the concave mirror and transmit display light reflected by the concave mirror,
wherein, in an optical system:
in a range inside an effective viewing angle, a distortion is equal to or less than 5%;
in a range outside the effective viewing angle, a distortion exceeds 5% and increases toward an outside of a viewing field;
in the range inside the effective viewing angle, an image height property, indicating a relationship between a viewing angle and an image height corresponding to a distance from an optical axis of the display element in a left-right direction, is linear, wherein the viewing angle is an angle extended radially from an eye of the user; and
in the range outside the effective viewing angle, the image height property is not linear.

2. The head-mounted display according to claim 1, wherein in the range outside the effective viewing angle, the image height property has a relaxation curve shape.

3. The head-mounted display according to claim 1, wherein
the concave mirror is an aspherical mirror having a sag amount Z expressed by Expression (4) below:

[Ex. 2]

$$Z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} \quad (4)$$

k=0 and $\alpha 1$=0,
an absolute value of $\alpha 2$ is less than or equal to $1.735 \times 10^{-7}$, and
an absolute value of $\alpha 3$ is less than or equal to $2.151 \times 10^{-10}$ (where r denotes a radial distance, c denotes a curvature, k denotes a conic constant, $\alpha 1$ denotes a second-order aspherical coefficient, $\alpha 2$ denotes a fourth-order aspherical coefficient, $\alpha 3$ denotes a sixth-order aspherical coefficient, $\alpha 4$ denotes an eighth-order aspherical coefficient, and $\alpha 5$ denotes a tenth-order aspherical coefficient).

4. The head-mounted display according to claim 3, wherein $\alpha 2$ is zero, and $\alpha 3$ is zero.

5. The head-mounted display according to claim 3, wherein
the absolute value of $\alpha 2$ is more than or equal to $8.049 \times 10^{-8}$ and less than or equal to $1.735 \times 10^{-7}$,
the absolute value of $\alpha 3$ is more than or equal to $9.832 \times 10^{-11}$ and less than or equal to $2.151 \times 10^{-10}$,
an absolute value of $\alpha 4$ is more than or equal to $1.181 \times 10^{-13}$ and less than or equal to $2.432 \times 10^{-13}$, and
an absolute value of $\alpha 5$ is more than or equal to $2.687 \times 10^{-17}$ and less than or equal to $5.656 \times 10^{-17}$.

6. The head-mounted display according to claim 1, further comprising:
a control unit configured to generate a display signal for displaying the display image, wherein
the control unit corrects the display image in accordance with a property of the distortion of the optical system.

* * * * *